(12) United States Patent
Glawion et al.

(10) Patent No.: US 7,438,544 B2
(45) Date of Patent: Oct. 21, 2008

(54) MELT-BLOW HEAD WITH VARIABLE SPINNING WIDTH

(76) Inventors: Erwin Glawion, Anne-Frank-Str. 21, 63762 Grossostheim (DE); Georg Harwarth, Königsberger Str. 11, 63755 Alzenau (DE); Burkard Kampfmann, St.-Michael-Str. 10, 63776 Mömbris (DE)

( * ) Notice: Subject to any disclaimer, the term of this patent is extended or adjusted under 35 U.S.C. 154(b) by 0 days.

(21) Appl. No.: 11/541,609

(22) Filed: Oct. 3, 2006

(65) Prior Publication Data

US 2007/0104812 A1 May 10, 2007

(30) Foreign Application Priority Data

Nov. 8, 2005 (DE) .................. 10 2005 053 248

(51) Int. Cl.
*D01D 4/02* (2006.01)
*D01D 5/12* (2006.01)

(52) U.S. Cl. .............. 425/7; 425/72.2; 425/192 S; 425/382.2; 425/464

(58) Field of Classification Search ............. 425/7, 425/66, 72.2, 192 S, 382.2, 464
See application file for complete search history.

(56) References Cited

U.S. PATENT DOCUMENTS

| 5,260,003 | A | | 11/1993 | Nyssen et al. |
| 5,618,566 | A | * | 4/1997 | Allen et al. ............ 425/7 |
| 5,728,407 | A | * | 3/1998 | Matsui ................ 425/7 |
| 6,114,017 | A | | 9/2000 | Fabbricante et al. |
| 6,422,848 | B1 | | 7/2002 | Allen et al. |
| 6,946,093 | B2 | * | 9/2005 | Allen ................ 264/555 |
| 7,156,639 | B2 | * | 1/2007 | Baumeister ........... 425/192 S |
| 2002/0076460 | A1 | * | 6/2002 | Fare ................. 425/72.2 |
| 2003/0234463 | A1 | | 12/2003 | Erickson et al. |

FOREIGN PATENT DOCUMENTS

| DE | 40 40 242 A1 | 6/1992 |
| DE | 698 09 487 T2 | 7/2003 |
| DE | 103 58 170 A1 | 7/2004 |
| DE | 697 27 136 T2 | 10/2004 |
| EP | 1 486 591 A1 | 12/2004 |

* cited by examiner

*Primary Examiner*—Robert B. Davis
*Assistant Examiner*—Joseph Leyson
(74) *Attorney, Agent, or Firm*—Birch, Stewart, Kolasch & Birch, LLP

(57) ABSTRACT

Melt-blow head with a rectilinear row of nozzle bores arranged in a nozzle bar of a nozzle assembly, the nozzle bores serving to produce endless filaments formed from a melt, the nozzle bores being associated with blowing slots, in the form of longitudinal slots, to which nozzle bores the melt is fed, via melt feed pipes from one or more distribution bars and via melt pipes in a distribution block of the nozzle assembly. The blowing slots are supplied with the blow air through blow-air feed pipes in a blow-air feed element via blow-air distribution bores. A spinning width of the melt-blow head is variable, wherein only those blow-air distribution bores associated with the nozzle bores to be fed are connected to the blowing slots via blow-air pipes in the distribution block and, where appropriate, the other blow-air distribution bores are closed.

8 Claims, 7 Drawing Sheets

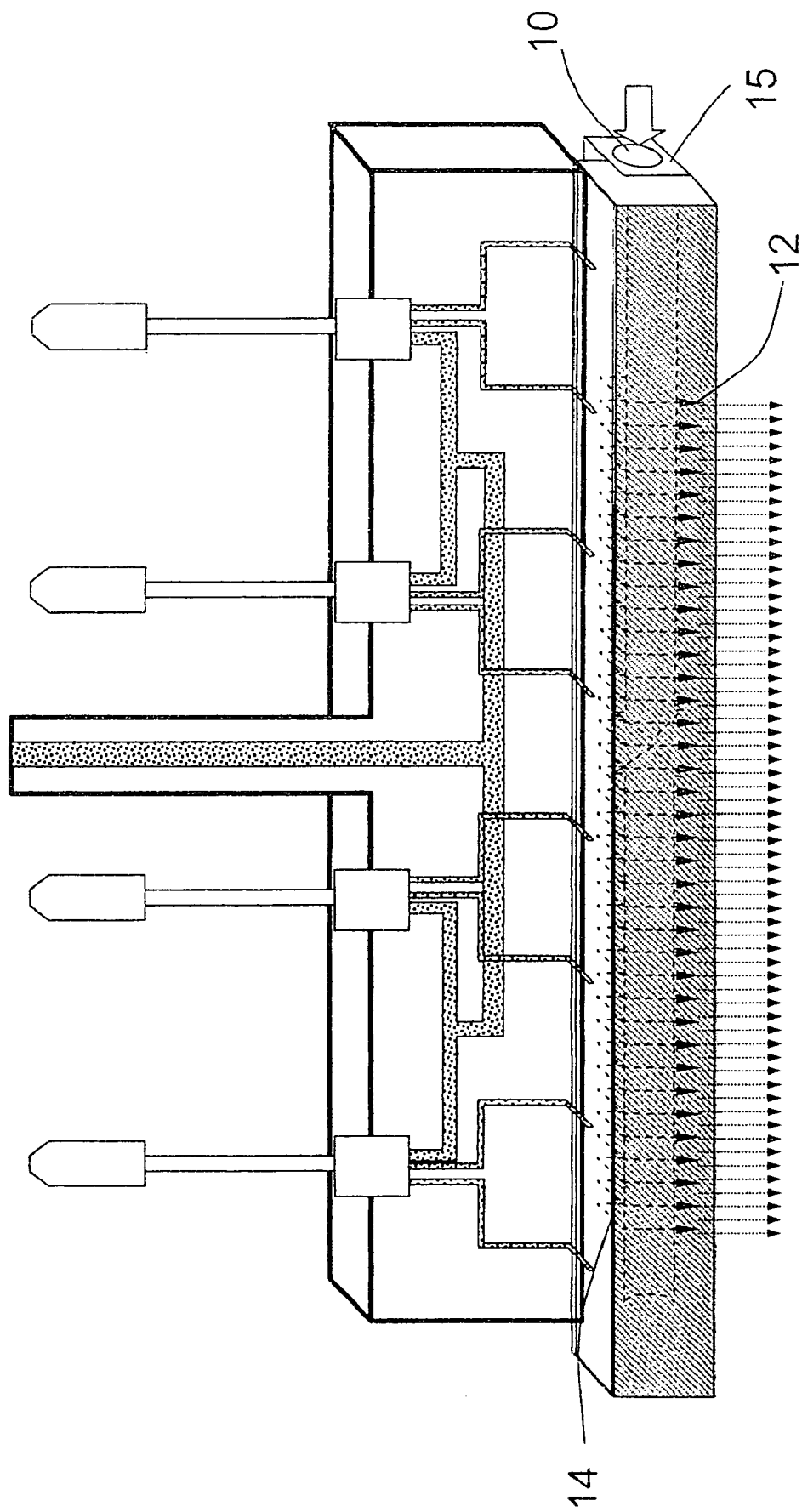

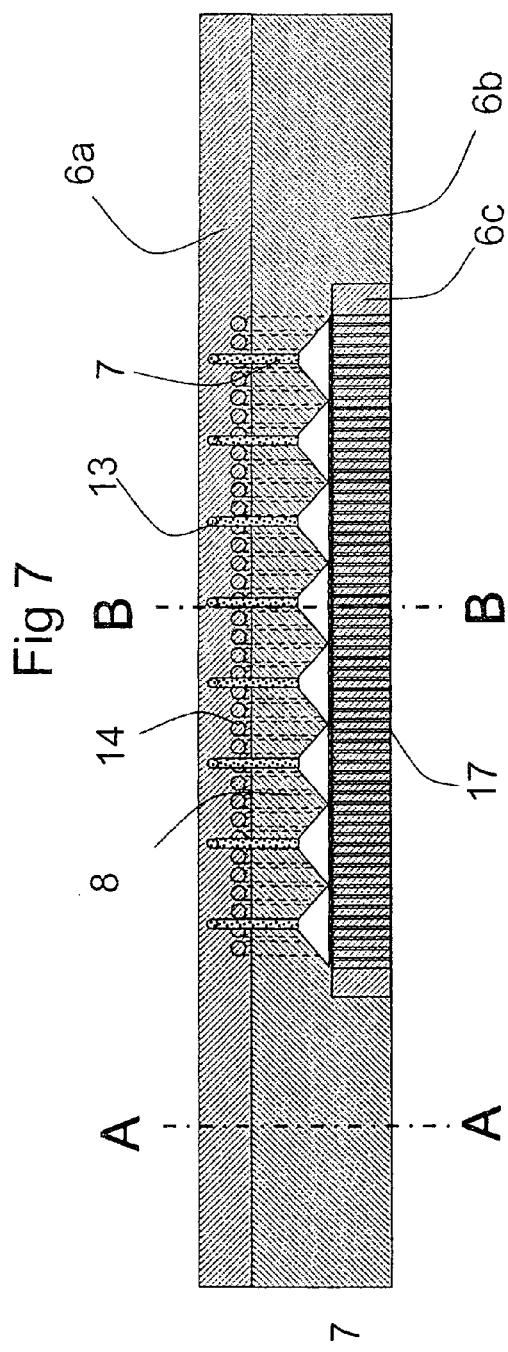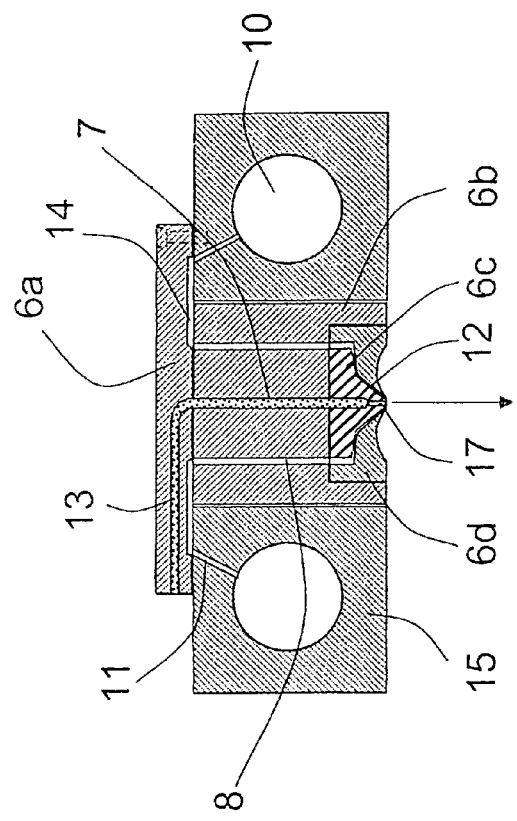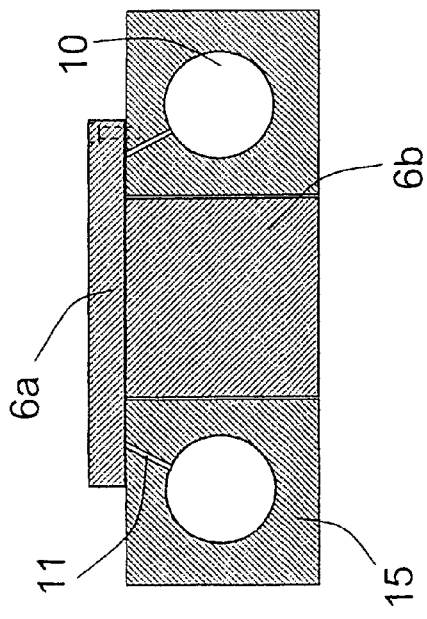

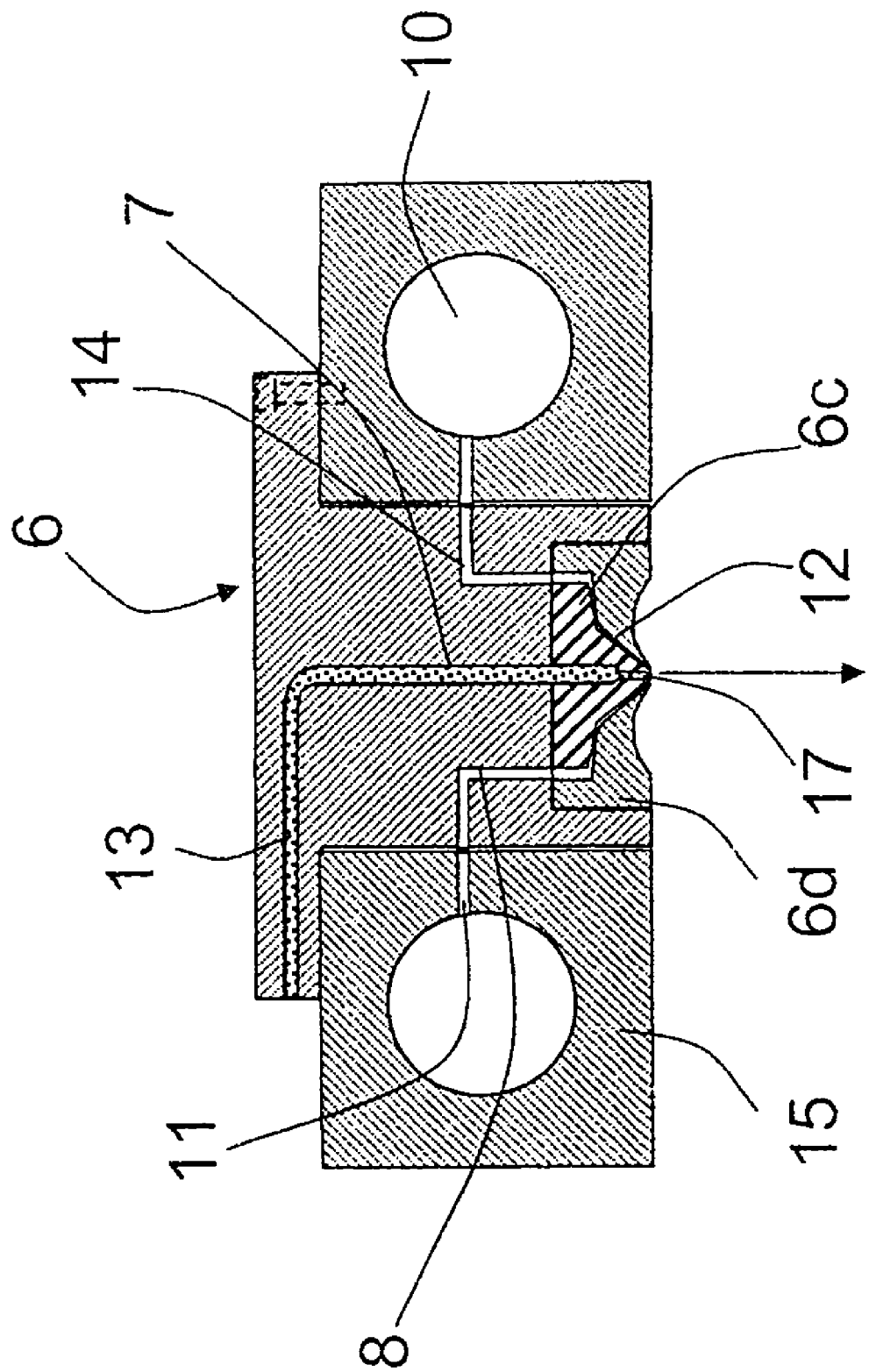

MELT-BLOW HEAD WITH VARIABLE SPINNING WIDTH

BACKGROUND OF THE INVENTION

1. Field of the Invention

The invention relates to a melt-blow head with a rectilinear row of nozzle bores arranged in a nozzle bar of a nozzle assembly, said nozzle bores serving to produce endless filaments formed from a melt, said nozzle bores being associated with blowing slots, in the form of longitudinal slots, of two slot-plates for feeding blowing air at an angle to the nozzle bores and to which nozzle bores the melt is fed, via melt feed pipes from one or more distribution bars and via melt pipes in a distribution block of the nozzle assembly, to those nozzle bores in the nozzle bar which are to be fed with the melt, wherein the blowing slots are supplied with the blow air through blow-air feed pipes in a blow-air feed element via blow-air distribution bores.

2. Description of Background Art

Such a melt-blow head is described and presented in German patent specification DE 103 58 170 B3. In the known melt-blow head, the melt feed pipe leads from a melt pipe via a lateral inlet and via a removable connector as well as via a redirecting means in a substantially vertical direction to a distributor distributing the melt to individual nozzle bores, the nozzle assembly being fixed in a defined position with respect to the slot-plates and being removable therefrom in an approximately vertical direction. In said publication, the blow air is supplied via spaces between the blow-air feed element and the nozzle assembly. A variability of the spinning width of the known melt-blow head is not discussed in the aforementioned patent specification.

Known from European patent application EP 1 486 591 A1 is a device for the production of filaments, more particularly from thermoplastic material, the filaments issuing from spinning nozzle openings of a spinning nozzle plate. A distribution device is provided for distributing a supplied plastic melt. Positioned downstream of the distribution device is at least one exchangeable distribution plate. Positioned downstream of the distribution plate is an exchangeable spinning nozzle plate. The spinning width formed by the distribution openings in the exchangeable distribution plate is smaller or greater than the spinning width provided by the distribution device. By means of the at least one exchangeable distribution plate, the spinning width of the distribution device can be reduced or increased to the final spinning width. Therefore, the desired final spinning width is adjustable through replacement of the distribution plate. The supply and/or adaptation of a blow-air addition according to different spinning widths is not discussed in the aforementioned document.

Generally, the continuous production of melt-spun nonwoven fabrics, which include both spunbond nonwovens in the conventional sense and also microfibre nonwovens, manufactured in meltblown systems, is accomplished by systems with predetermined working widths or spinning widths, such systems not being subject to any defined standard. There are, however, certain industry-typical specifications; for example, typical spinning widths are 1600, 2600, 3200 and 4200 mm. In a second working step, the correspondingly produced nonwoven fabrics are then assembled to the final width, it being the case, however, that, usually, the spinning widths cannot be fully utilized, with the result that, in the worst case, up to 50% of the roll width is wasted.

In the case of the adjustment of the spinning width via exchangeable distribution plates, as known from European patent application EP 1 486 591 A1 (see above), the plastic melt is distributed over a reduced or increased width of the downstream, likewise exchangeable spinning nozzle plate. In the case of such narrowing or widening, however, it must be expected that the plastic melt will not be uniformly distributed across the entire spinning width on both sides of the narrowing or widening and that, inside a hole field of the spinning nozzle plate, there will be a different plastic-melt distribution which may find expression in differences in the weight per unit area of the end product across the working width as well as in filament breaks because of excessive or insufficient supply of melt, this possibly having a negative impact on productivity.

If one wishes to vary the effective spinning width, for example by positioning the melt-blow head at an angle in relation to the production direction of the nonwoven fabric which is to be produced, this would necessitate correspondingly flexible connections of the supply lines for water and power as well as for plastic melt and blow air.

Furthermore, with both of the aforementioned possibilities for adjusting the effective width of the produced nonwoven fabric webs, it is necessary also to adapt the feed width of the hot blow air to the spinning width, because said blow air, in the form of hot compressed air, represents an immense cost factor in production. It is, therefore, desirable to reduce the consumption of hot blow air in order to cut costs. In the known prior art (see above), however, this topic is either not addressed at all or (e.g. in cases where the entire system or at least parts thereof is/are positioned at an angle) this requires complex measures which necessitate the complete conversion/exchange of the associated blow-air supply.

SUMMARY AND OBJECTS OF THE INVENTION

Therefore, the object of the invention is to provide a melt-blow head which overcomes the disadvantages of the prior art and which, in particular, allows the simple, fast and cost-effective adaptation of the width of the produced nonwoven fabric webs, it being possible, in particular, also to reduce the quantity of required hot blow air under pressure.

Preferred embodiments of the invention are defined in the attached subclaims.

The melt-blow head according to the invention comprises a nozzle assembly with a rectilinear row of nozzle bores arranged in a nozzle bar of the nozzle assembly, said nozzle bores serving to produce endless filaments formed from a melt. The nozzle bores are associated with blowing slots, in the form of longitudinal slots, of two slot-plates for feeding blowing air at an angle to the nozzle bores. The melt is fed, via melt feed pipes from one or more distribution bars and via melt pipes in a distribution block of the nozzle assembly, to those nozzle bores in the nozzle bar which are to be fed with the melt. The blowing slots are supplied with the blow air through blow-air feed pipes in a blow-air feed element via blow-air distribution bores. According to the invention, the spinning width of the melt-blow head is variable in that or wherein the nozzle assembly or at least individual parts thereof (e.g. the nozzle bar and/or the distribution block and/or an exchangeable top part) is/are exchangeable, wherein, irrespective of the spinning width, each of the melt feed pipes of the distribution bar(s) in the melt-blow head is connected to one of the melt pipes in the distribution block, and wherein, depending on the spinning width, only those blow-air distribution bores associated with the nozzle bores to be fed with the melt are connected to the blowing slots via blow-air pipes in the distribution block and, where appropriate, the other blow-air distribution bores are closed. The spinning width of the melt-blow head is therefore variable according to the invention, wherein, through cross-connections, melt pipes and through associated blow-air pipes in the nozzle assembly or in the distribution block of the nozzle assembly, there is a supply of melt and blow-air adapted to the spinning width, merely the nozzle assembly or at least parts thereof having to be exchanged. The conversion of the entire blow-air supply, more especially the replacement of the blow-air feed element, is thus avoided. Any non-required blow-air distribution bores are closed by the nozzle assembly or by parts thereof. Since each of the melt feed pipes of the distribution bar(s) in the melt-blow head is connected to a corresponding melt pipe in the nozzle assembly or in the distribution block of the nozzle assembly, there is not a variable distribution of melt because of excessive or insufficient supply of melt in individual regions of the width or spinning width of the melt-blow head. The melt-blow head according to the invention provides a simple, cost-effective and quick-to-implement width adaptation which also provides the corresponding adaptation of the width of supply of the blow air, this making it possible to reduce the consumption of hot blow air which is under pressure.

According to a preferred embodiment of the invention, irrespective of the spinning width, each of the melt feed pipes of the distribution bar(s) in the melt-blow head is connected to the melt pipes in the distribution block via a, preferably substantially horizontal, melt cross-connection in the nozzle assembly.

According to a preferred embodiment of the invention, depending on the spinning width, only those blow-air distribution bores associated with the nozzle bores to be fed are connected to the blowing slots via blow-air cross-connections in the nozzle assembly and via the blow-air pipes in the distribution block and, where appropriate, the other blow-air distribution bores are closed.

The routing of the melt pipes in the nozzle assembly or in the distribution block of the nozzle assembly is preferably vertical and the routing of the respective melt cross-connections is preferably substantially horizontal and, depending on the required spinning width, vertical or substantially vertical or at an angle to the width extent of the rectilinear row of nozzle bores.

According to a particularly preferred embodiment of the invention, the melt-blow head comprises a nozzle assembly which has an exchangeable top part with the melt cross-connections, via which melt cross-connections each of the melt feed pipes of the distribution bar(s) in the melt-blow head is connected to the corresponding melt pipe in the distribution block or in the nozzle assembly and therefore to those nozzle bores in the nozzle bar of the nozzle assembly which are to be fed with the melt. Consequently, where necessary, it is possible, already through the simple replacement of said exchangeable top part, to reduce the spinning width, wherein the corresponding melt cross-connections from the (constantly spaced) melt feed pipes of the distribution bar(s) converge somewhat substantially horizontally at an angle and thus connect the melt feed pipes to the melt pipes in the distribution block, which melt pipes, where necessary, also lie closer together.

According to the invention, it is particularly preferred that the exchangeable top part of the nozzle assembly comprises the substantially horizontal blow-air cross-connections, via which blow-air cross-connections only those blow-air distribution bores associated with the nozzle bores to be fed are connected to the blow-air pipes in the distribution block and therefore to the blowing slots. The other blow-air distribution bores which are not required for a narrower spinning width are then preferably closed by the exchangeable top part or by corresponding regions thereof.

According to a preferred embodiment of the invention, therefore, the correspondingly preferred exchangeable top part provides an especially simple selection and adjustability of the desired spinning width.

In a particularly preferred embodiment, the other blow-air distribution bores which are not required for a narrower spinning width are closed by the nozzle assembly, more particularly by the exchangeable top part.

In a preferred embodiment, the other blow-air distribution bores which are not required for a narrower spinning width can also be closed by the distribution block of the nozzle assembly.

Particularly preferred is an embodiment of the melt-blow head according to the invention in which the exchangeable top part and the distribution block of the nozzle assembly are integral with each other, with the result that, through simple replacement of said part, the aforementioned advantages of the invention can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Hereinbelow, the invention is described with reference to the illustrative example embodiments presented in the drawings, in which:

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 shows a diagrammatic view of a melt-blow head with a blow-air feed element and a nozzle assembly according to a further embodiment of the invention;

FIG. 7 shows a diagrammatic, partially cut-away front view of a nozzle assembly of the embodiment of the present invention according to FIGS. 5 and 6;

FIG. 8 shows a section along line A-A from FIG. 7;

FIG. 9 shows a section along line B-B from FIG. 7; and

FIG. 10 shows a sectional view of yet a further preferred embodiment of a nozzle assembly according to the invention.

DETAILED DESCRIPTION OF THE PREFERRED EMBODIMENTS

Figure 1:
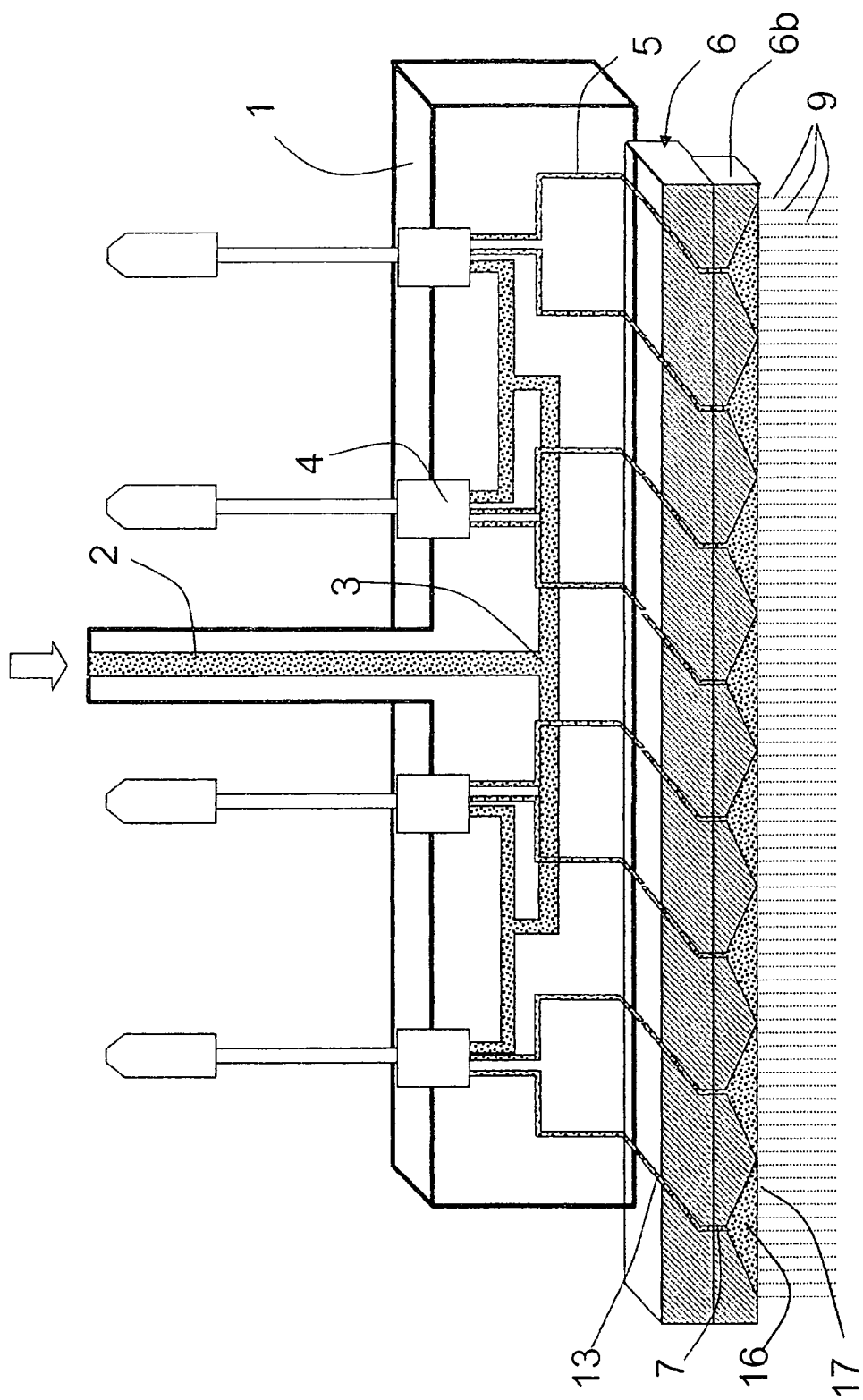
FIG. 1 shows a diagrammatic view of a melt-blow head with a nozzle assembly according to an embodiment of the invention.

FIG. 1 shows a diagrammatic view of a melt-blow head according to the invention with a first embodiment of a nozzle assembly 6 according to the invention. The melt-blow head comprises a distribution bar 1 in which are provided melt feed pipes 2, 5 for supplying a plastic melt, melt pumps 4 serving to move the melt in the melt-blow head. In FIG. 1 there are eight melt feed pipes 5 in the distribution bar 1. According to the invention, the spinning width of the melt-blow head presented in FIG. 1 is variable in that the nozzle assembly 6 or at least parts thereof is/are exchangeable. Each of the eight melt feed pipes 5 in the melt-blow head is fluidically connected via respective melt cross-connections 13 to respective melt pipes 7 in a distribution block 6b. Via melt distributors 16 connected to the melt pipes 7, the supplied plastic melt is then delivered through nozzle bores 17 in the form of filaments 9.

Figure 2:
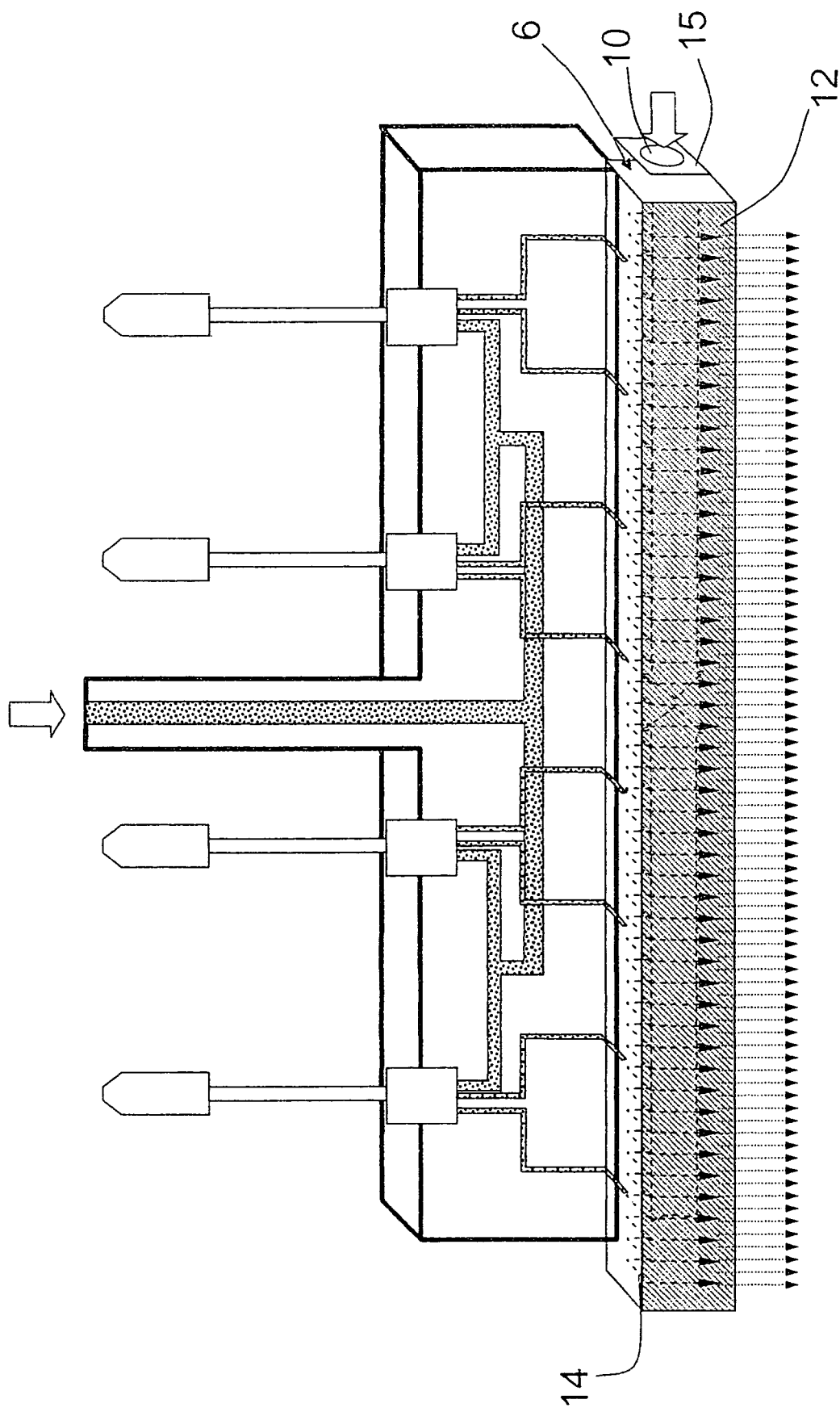
FIG. 2 shows a diagrammatic view of a melt-blow head with a blow-air feed element and a nozzle assembly according to an embodiment of the invention.

FIG. 2 shows the melt-blow head from FIG. 1, parts of the nozzle assembly 6 having in this case been omitted for the purposes of illustration; however, a blow-air feed element 15 with a blow-air feed pipe 10 is presented. Furthermore, the routing of the blow air in the melt-blow head according to the invention is diagrammatically indicated by a dashed line. The blow air is supplied via blow-air cross-connections 14 to each of the blowing slots 12, where it is blown out.

Figure 3:
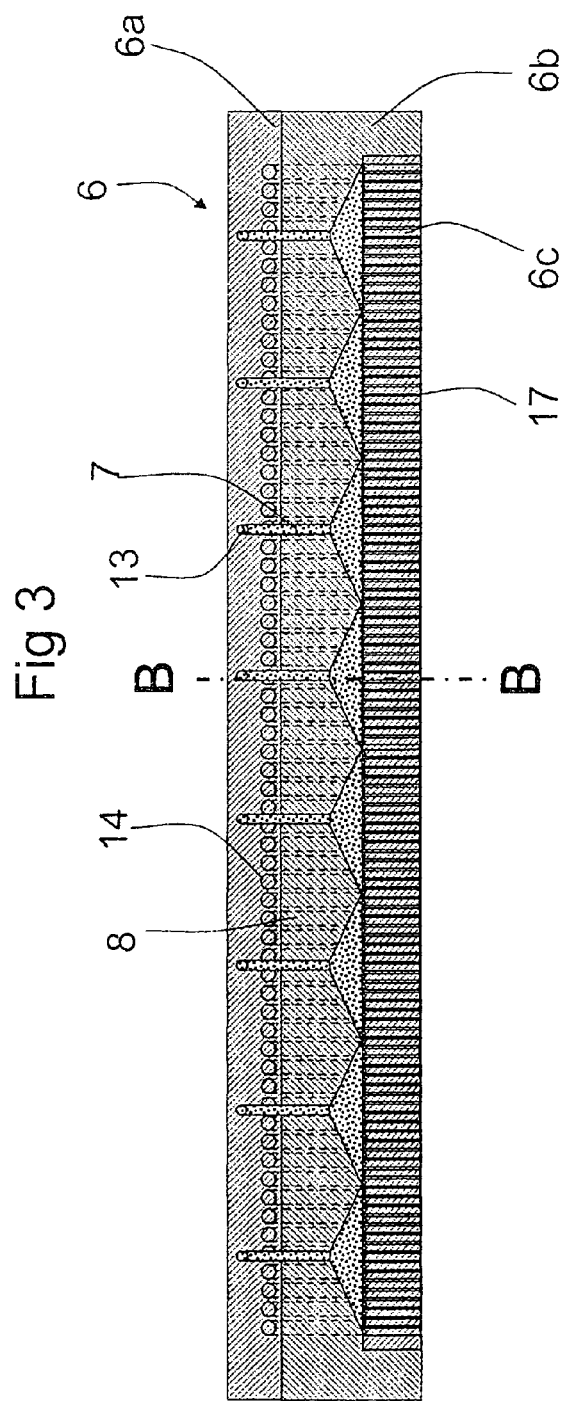
FIG. 3 shows a diagrammatic, partially cut-away front view of a nozzle assembly of the embodiment of the present invention according to FIGS. 1 and 2.

FIG. 3 presents, in a partially sectional view, an illustration of the nozzle assembly 6 as employed in the embodiment shown in FIGS. 1 and 2. The nozzle assembly 6 comprises the distribution block 6b, a nozzle bar 6c containing the nozzle bores 17, and an exchangeable top part 6a. Via melt cross-connections 13 in the exchangeable top part 6a and via the melt pipes 7 in the distribution block 6b, the melt is supplied via melt distributors 16 to the individual nozzle bores in the nozzle bar 6c of the nozzle assembly 6. Associated in parallel with the nozzle bores 17, blow-air pipes 8 are provided in the distribution block 6b, said blow-air pipes 8 being connected, via blow-air cross-connections 14 in the exchangeable top part 6a, to blow-air feed pipes via blow-air distribution bores (not visible in FIG. 3) to the blow-air pipes 8 in the distribution block 6b.

Figure 4:
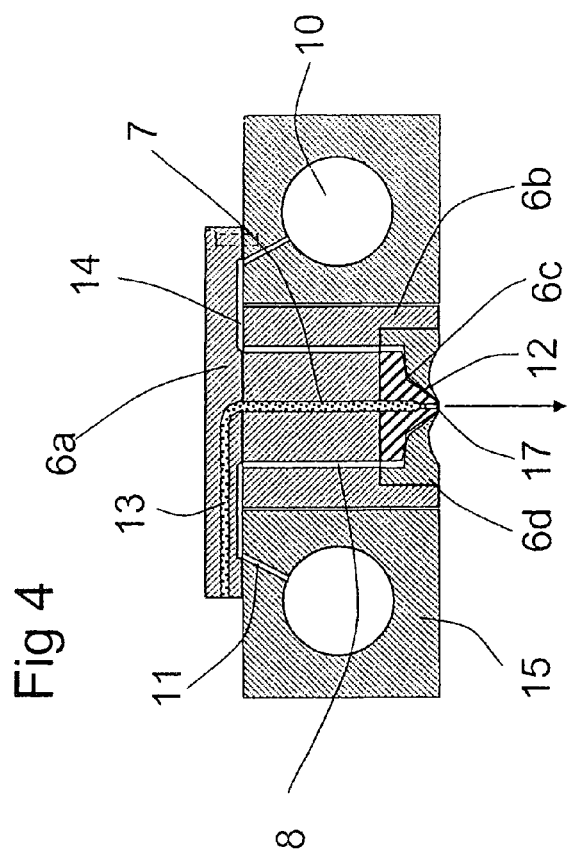
FIG. 4 shows a section along line B-B from FIG. 3.

FIG. 4 shows a section along line B-B from FIG. 3. It can be seen in FIG. 4 that the melt is supplied via the melt cross-connections 13, which extend substantially horizontally in the exchangeable top part 6a, to the vertically extending melt pipe 7 in the distribution block 6b and to the nozzle bores 17 in the nozzle bar 6c of the nozzle assembly 6. The exchangeable nozzle assembly 6 according to the invention is fitted between two blow-air feed elements 15. Each of the blow-air feed elements 15 has a central blow-air feed pipe 10 which—via blow-air distribution bores 11, via blow-air cross-connections 14 in the nozzle assembly 6 or, in the present case, in the exchangeable top part 6a and via blow-air pipes 8 in the distribution block 6b—supplies blow air to the blowing slots 12, provided between the nozzle bar 6c and two air bars 6d. According to the embodiment presented in FIGS. 1-4, all the blow-air distribution bores 11 are connected via the blow-air cross-connections 14 to the blow-air pipes 8.

Figure 5:
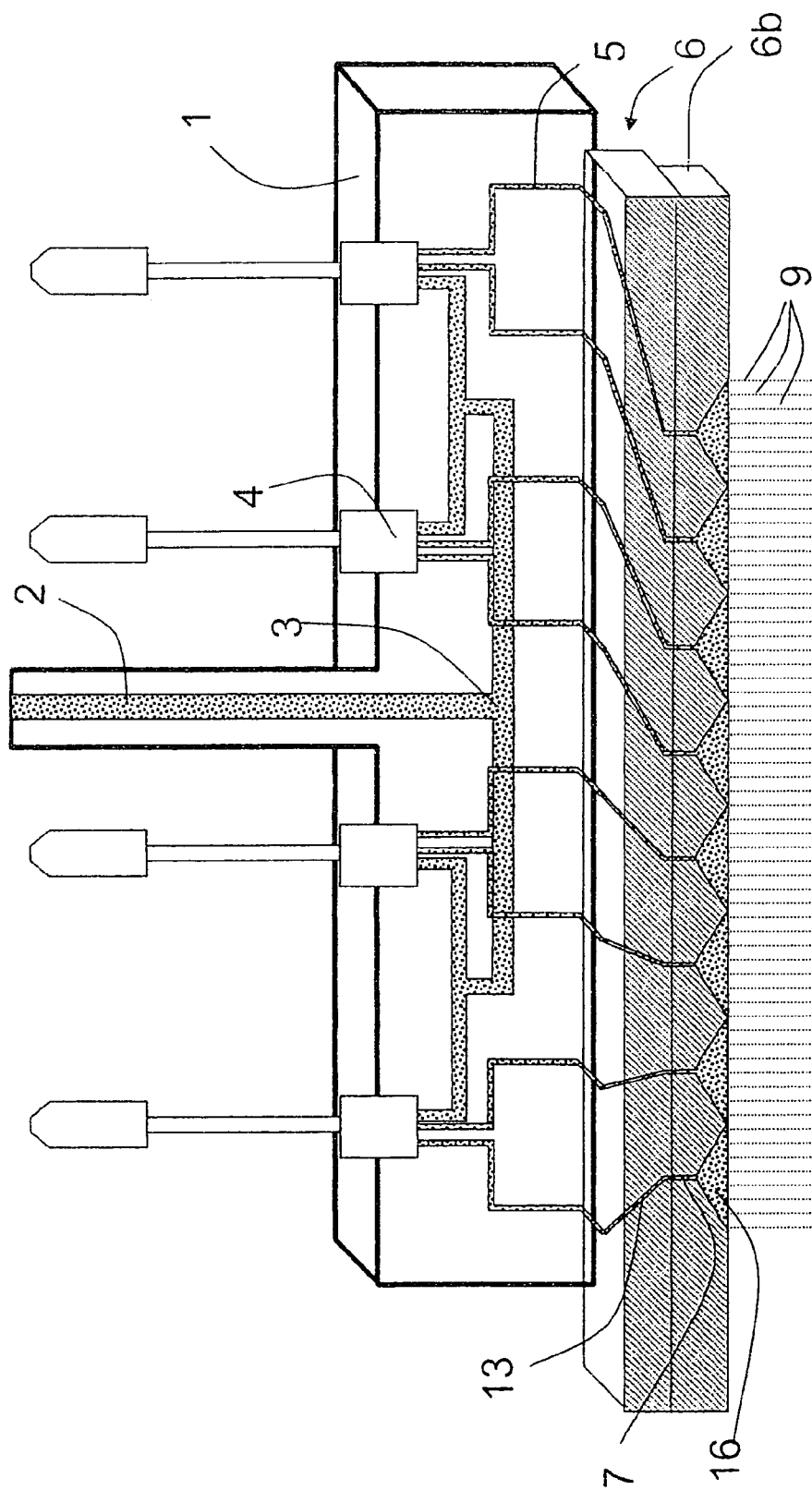
FIG. 5 shows a diagrammatic view of a melt-blow head with a nozzle assembly according to a further embodiment of the invention.

FIG. 5 shows a melt-blow head with a nozzle assembly 6 according to a further embodiment of the invention. In FIG. 5, identical reference characters identify identical elements to those in the previously described Figures, more particularly as in FIG. 1, with the result that there is here no repetition of the description of those elements, reference being made to the corresponding parts of the description.

In contrast to the embodiment presented in FIG. 1, the embodiment in FIG. 5 comprises a nozzle assembly 6 with a smaller spinning width of the melt-blow head, wherein, in the exchangeable nozzle assembly 6, the melt cross-connections 13 are disposed at an angle to the rectilinear row of nozzle bores 17. Consequently, despite the in this case reduced spinning width as compared with the spinning width shown in FIGS. 1-4, all the melt feed pipes 5 in the distribution bar 1 are connected to all the melt pipes 7 in the distribution block 6b of the nozzle assembly 6.

FIG. 6 shows the routing of the blow air (indicated by dashed-line arrows) according to the second embodiment of the nozzle assembly 6 of the invention. The blow air is supplied via the blow-air feed elements 15 which have not been exchanged or are not to be exchanged, wherein, however, those blow-air distribution bores 11 which are not required for the here presented narrower spinning width have been closed by the nozzle assembly 6 or by parts thereof, with the result that only in the region of those nozzle bores 17 fed with melt and across the correspondingly reduced spinning width is blow air supplied via the corresponding blow-air cross-connections 14 in the nozzle assembly 6.

FIG. 7 presents, in a cut-away view, the nozzle assembly 6, wherein, in contrast to the nozzle assembly presented in FIG. 3, said nozzle assembly 6 has a reduced spinning width. It can clearly be seen that there are only blow-air cross-connections 14 in the region of the spinning width. This is additionally illustrated by the representations in FIGS. 8 and 9.

FIG. 8 shows a section along line A-A from FIG. 7, FIG. 9 showing a section along line B-B from FIG. 7.

As can be seen from FIG. 8, those blow-air distribution bores 11 which are not required for the narrower spinning width of the exchangeable nozzle assembly 6 in the presented second embodiment are closed by the top part 6a of the nozzle assembly 6. As is apparent from FIG. 9, in the region of the reduced spinning width, the supply of melt and the supply of blow air are as in the presented first embodiment with wider spinning width. To that extent, the sectional representations in FIG. 9 and FIG. 4 are identical.

FIG. 10 presents a further embodiment of an exchangeable nozzle assembly 6 of the invention in a sectional view. According to the embodiment presented in FIG. 10, the distribution block and the top part of the nozzle assembly are integral with each other. The blow-air cross-connection 14 is disposed not in the top part, but in the region of the distribution block of the correspondingly integrally formed nozzle assembly. The sectional view in FIG. 10 is shown in the region of the reduced spinning width, similarly to the sectional view in FIG. 9 and corresponding to the non-reduced spinning width and the corresponding sectional view to in FIG. 4.

It should generally be noted that all the Figures are merely diagrammatic representations of the corresponding embodiments of the invention and that, in the Figures, identical reference characters identify identical elements.

What is claimed is:

1. Melt-blow head with a rectilinear row of nozzle bores (17) arranged in a nozzle bar (6c) of a nozzle assembly (6), said nozzle bores (17) serving to produce endless filaments formed from a melt, said nozzle bores (17) being associated with blowing slots (12), in the form of longitudinal slots, of two slot-plates for feeding blowing air at an angle to the nozzle bores (17) and to which nozzle bores (17) the melt is fed, via melt feed pipes (2, 5) from one or more distribution bars (1) and via melt pipes (7) in a distribution block (6b) of the nozzle assembly (6), to those nozzle bores (17) in the nozzle bar (6c) which are to be fed with the melt, wherein the blowing slots (12) are supplied with the blow air through blow-air feed pipes (10) in a blow-air feed element (15) via blow-air distribution bores (11), characterized in that a spinning width of the melt-blow head is variable, the nozzle assembly (6) or at least parts thereof being exchangeable, wherein, irrespective of the spinning width, each of the melt feed pipes (5) of the distribution bar(s) (1) in the melt-blow head is connected to the melt pipes (7) in the distribution block (6b), and wherein, depending on the spinning width, only those blow-air distribution bores (11) associated with the nozzle bores (17) to be fed are connected to the blowing slots (12) via blow-air pipes (8) in the distribution block (6b) and, where appropriate, the other blow-air distribution bores (11) are closed.

2. Melt-blow head according to claim 1, characterized in that, irrespective of the spinning width, each of the melt feed pipes (5) of the distribution bar(s) (1) in the melt-blow head is connected to the melt pipes (7) in the distribution block (6b) via a melt cross-connection (13) in the nozzle assembly (6).

3. Melt-blow head according to claim 1, characterized in that, depending on the spinning width, only those blow-air distribution bores (11) associated with the nozzle bores (17) to be fed are connected to the blowing slots (12) via blow-air cross-connections (14) in the nozzle assembly (6) and via the blow-air pipes (8) in the distribution block (6b) and, where appropriate, the other blow-air distribution bores (11) are closed.

4. Melt-blow head according to claim 2, characterized in that the nozzle assembly (6) has all exchangeable top part (6a) with the melt cross-connections (13), via which melt cross-connections (13) each of the melt feed pipes (5) of the distribution bar(s) (1) in the melt-blow head is connected to the corresponding melt pipe (7) in the distribution block (6b) and therefore to those nozzle bores (17) in the nozzle bar (6c) which are to be fed with the melt.

5. Melt-blow head according to claim 4, characterized in that the exchangeable top part (6a) comprises the substantially horizontal blow-air cross-connections (14), via which blow-air cross-connections (14) only those blow-air distribution bores (11) associated with the nozzle bores (17) to be fed are connected to the blow-air pipes (8) in the distribution block (6b) and therefore to the blowing slots (12).

6. Melt-blow head according to claim 4, characterized in that the other blow-air distribution bores (11) are closed by the nozzle assembly (6), more particularly by tile exchangeable top part (6a).

7. Melt-blow head according to claim 1, characterized in that the other blow-air distribution bores (11) are closed by the distribution block (6b).

8. Melt-blow head according to claim 4, characterized in that the exchangeable top part (6b) and the distribution block (6b) of the nozzle assembly (6) are integral with each other.

* * * * *

UNITED STATES PATENT AND TRADEMARK OFFICE
CERTIFICATE OF CORRECTION

PATENT NO. : 7,438,544 B2
APPLICATION NO. : 11/541609
DATED : October 21, 2008
INVENTOR(S) : Erwin Glawion et al.

Page 1 of 1

It is certified that error appears in the above-identified patent and that said Letters Patent is hereby corrected as shown below:

Title page, item [73]
ASSIGNEE: should read as follows:
RIETER Automatik Gmbh, Grossostheim, Germany Signed and Sealed this Fifteenth Day of September, 2009

David J. Kappos
*Director of the United States Patent and Trademark Office*